United States Patent
Wingert et al.

(10) Patent No.: US 10,732,284 B2
(45) Date of Patent: Aug. 4, 2020

(54) LIVE METROLOGY OF AN OBJECT DURING MANUFACTURING OR OTHER OPERATIONS

(71) Applicant: The Boeing Company, Chicago, IL (US)

(72) Inventors: Liam Antonio Wingert, Seattle, WA (US); Chris A. Cantrell, Seattle, WA (US); Anthony W. Baker, Gilbertsville, PA (US); Kenneth Paul Bowers, III, Smyrna, GA (US); James A. Grossnickle, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 15/663,397

(22) Filed: Jul. 28, 2017

(65) Prior Publication Data

US 2019/0033461 A1    Jan. 31, 2019

(51) Int. Cl.
     *G01S 17/00*          (2020.01)
     *G01S 17/89*          (2020.01)
     (Continued)

(52) U.S. Cl.
     CPC .............. *G01S 17/89* (2013.01); *G01B 11/24* (2013.01); *G01B 11/245* (2013.01); *G06T 7/001* (2013.01); *G06T 7/0006* (2013.01); *G06T 7/30* (2017.01); *G06T 7/521* (2017.01); *G06T 7/60* (2013.01); *G06T 17/20* (2013.01); *G01B 11/25* (2013.01);
     (Continued)

(58) Field of Classification Search
     USPC ........................................................ 356/5.01
     See application file for complete search history.

(56) References Cited

U.S. PATENT DOCUMENTS 6,611,267 B2 *   8/2003   Migdal .................. G06T 17/20
                                                          345/428
7,593,565 B2 *   9/2009   Reich ..................... G01C 17/00
                                                          382/145
(Continued)

FOREIGN PATENT DOCUMENTS

FR          2992762 A1     1/2014

OTHER PUBLICATIONS

Kadambi, Achuta, et al.; "Polarized 3D: High-Quality Depth Sensing with Polarization Cues," 2015 IEEE International Conference on Computer Vision, 2015, pp. 3370-3378.

(Continued)

*Primary Examiner* — James R Hulka
(74) *Attorney, Agent, or Firm* — Sage Patent Group (57) ABSTRACT

A method for live metrology of an object includes performing a scanning operation by a plurality of sensors to collect electronic images of an object. The electronic images include 3-D point cloud data for live metrology of the object and the point cloud data from each sensor define a point cloud that represents the object. The method also includes stitching the point clouds from the plurality of sensors to generate a reconstructed model of an as-manufactured object. The method further includes comparing the reconstructed model of the as-manufactured object to an as-designed model of the object to determine that the object is manufactured within an allowable tolerance to the as-designed model of the object.

20 Claims, 4 Drawing Sheets

(51) Int. Cl.
*G01B 11/245* (2006.01)
*G06T 7/30* (2017.01)
*G01B 11/24* (2006.01)
*G06T 7/521* (2017.01)
*G06T 7/00* (2017.01)
*G06T 7/60* (2017.01)
*G06T 17/20* (2006.01)
*G01B 11/25* (2006.01)

(52) U.S. Cl.
CPC ........... *G06T 2207/10028* (2013.01); *G06T 2207/20212* (2013.01)

(56) References Cited

U.S. PATENT DOCUMENTS

| | | | |
|---|---|---|---|
| 8,072,450 B2 | 12/2011 | Chang et al. | |
| 8,983,794 B1 | 3/2015 | Motzer et al. | |
| 9,234,749 B2* | 1/2016 | Gu | G01B 11/25 |
| 9,524,582 B2* | 12/2016 | Ma | G06T 17/20 |
| 9,646,410 B2* | 5/2017 | Collet Romea | G06T 15/205 |
| 9,928,314 B2* | 3/2018 | Bonner | G06T 15/08 |
| 10,062,207 B2* | 8/2018 | Huang | G06T 19/20 |
| 10,260,866 B2* | 4/2019 | Kadambi | G01B 11/24 |
| 2002/0167518 A1 | 11/2002 | Migdal et al. | |
| 2005/0140670 A1 | 6/2005 | Wu et al. | |
| 2006/0142971 A1 | 6/2006 | Reich et al. | |
| 2009/0160852 A1* | 6/2009 | Chang | G06T 7/0004 345/419 |
| 2011/0316978 A1 | 12/2011 | Dillon et al. | |
| 2012/0301013 A1 | 11/2012 | Gu | |
| 2015/0213646 A1 | 7/2015 | Ma et al. | |
| 2015/0294036 A1 | 10/2015 | Bonner | |
| 2015/0363972 A1 | 12/2015 | Isaksson et al. | |
| 2016/0261844 A1 | 9/2016 | Kadambi et al. | |
| 2017/0004649 A1 | 1/2017 | Collet Romea et al. | |
| 2017/0010087 A1 | 1/2017 | Polidor et al. | |
| 2017/0053438 A1 | 2/2017 | Huang et al. | |
| 2017/0193699 A1 | 7/2017 | Mehr et al. | |

OTHER PUBLICATIONS

Mahdaoui, Abdelaaziz, et al.; "Comparative Study of Combinatorial 3D Reconstruction Algorithms," International Journal of Engineering Trends and Technology, 2017, pp. 247-251, vol. 48.

European Patent Office; European Search Report for European Application No. 18174588 dated Aug. 15, 2018, 4 Pages.

European Patent Office; Office Action for European Application No. 18173753.7 dated Aug. 30, 2018, 11 Pages.

European Patent Office; Office Action for European Application No. 18174588.6 dated Sep. 10, 2018, 8 Pages.

Eiben, A.E., et al.; "Genetic algorithms with multi-parent recombination," PPSN III: Proceedings of the International Conference on Evolutionary Computation, The Third Conference on Parallel Problem Solving from Nature, 1994, pp. 78-87.

Kennedy, James, et al.; "Particle Swarm Optimization," Proceedings of IEEE International Conference on Neural Networks, IV, 1995, pp. 1942-1948.

Powell, M.J.D.; "An efficient method for finding the minimum of a function of several variables without calculating derivatives," Computer Journal, 7(2), 1964, pp. 155-162.

* cited by examiner

LIVE METROLOGY OF AN OBJECT DURING MANUFACTURING OR OTHER OPERATIONS

CROSS-REFERENCE TO RELATED APPLICATIONS

This application is related to U.S. application Ser. No. 15/663,190, now U.S. Pat. No. 10,438,408, entitled "Resolution Adaptive Mesh for Performing 3-D Metrology of an Object," filed the same date as the present application and is incorporated herein by reference.

This application is also related to U.S. application Ser. No. 15/663,243, now U.S. Pat. No. 10,354,444 entitled "Resolution Adaptive Mesh That Is Generated Using an Intermediate Implicit Representation of a Point Cloud," filed the same date as the present application and is incorporated herein by reference.

FIELD

The present disclosure relates to inspecting an object and performing measurements or metrology of the object, and more particularly to live or near real-time metrology of an object during manufacturing or other operations.

BACKGROUND

Inspecting larger components or objects during manufacturing or other processes is a time-consuming and labor intensive operation which adds cost and time to the manufacturing process. Inaccuracies in measuring such components during manufacturing can also cause manufacturing inefficiencies and quality defects. Accordingly, there is a need for a system and method that overcomes these deficiencies, detects defects early in the production cycle, decreases inspection time and is useable for automation of manufacturing, inspection or other processes.

SUMMARY

In accordance with an embodiment, a method for live metrology of an object includes performing a scanning operation by a plurality of sensors to collect electronic images of an object. The electronic images include three-dimensional (3-D) point cloud data for live metrology of the object and the point cloud data from each sensor defines a point cloud that represents the object. The method also includes stitching the point clouds from the plurality of sensors together to generate a reconstructed model of an as-manufactured object. The method further includes comparing the reconstructed model of the as-manufactured object to an as-designed model of the object to determine that the object is manufactured within an allowable tolerance to the as-designed model of the object.

In accordance with another embodiment, a system for live metrology of an object includes a plurality of sensors for performing a scanning operation to collect electronic images of an object. The electronic images include 3-D point cloud data for live metrology of the object. The point cloud data from each sensor defines a point cloud that represents the object. The system also includes a processor and a live metrology module operating on the processor. The live metrology module is configured to perform a set of functions including stitching the point clouds together from the plurality of sensors to generate a reconstructed model of an as-manufactured object. The set of functions also includes comparing the reconstructed model of the as-manufactured object to an as-designed model of the object to determine that the object is manufactured within an allowable tolerance to the as-designed model of the object.

In accordance with a further embodiment, a computer program product for live metrology of an object includes a computer readable storage medium having program instructions embodied therewith. The computer readable storage medium is not a transitory medium per se. The program instructions are executable by a device to cause the device to perform a method including performing a scanning operation by a plurality of sensors to collect electronic images of an object. The electronic images include 3-D point cloud data for live metrology of the object. The point cloud data from each sensor defines a point cloud that represents the object. The method also includes stitching the point clouds from the plurality of sensors together to generate a reconstructed model of an as-manufactured object. The method further includes comparing the reconstructed model of the as-manufactured object to an as-designed model of the object to determine that the object is manufactured within an allowable tolerance to the as-designed model of the object.

In accordance with another embodiment or any of the previous embodiments, the method or set of functions further includes placing the plurality of sensors in a predetermined array or arrays of different types of sensors.

In accordance with another embodiment or any of the previous embodiments, the method or set of functions further includes placing the plurality of sensors a predetermined distance from the object to avoid interference from humans and equipment during manufacturing.

In accordance with another embodiment or any of the previous embodiments, the method or set of functions further includes positioning the object in a selected orientation for performing the scanning operation with a surface or side of the object to be scanned facing the sensors and storing the 3-D point cloud data after performing the scanning operation. The method or set of functions additionally includes repositioning the object in other selected orientations for scanning other surfaces or sides of the object and storing the 3-D point cloud data after performing each scanning operation. Stitching the point clouds together includes stitching the point clouds from each of the selected orientations of the object together.

In accordance with another embodiment or any of the previous embodiments, performing the scanning operation includes creating a depth map using a group of time-of-flight sensors of the plurality of sensors. The depth map includes a point cloud of point cloud data including distances from the time-of-flight sensors to the object. Performing the scanning operation also includes scanning the object using a multiplicity of polarization sensors or scanning sensors of the plurality of sensors using the depth map to collect a multiplicity of polarization images. Each polarization image defines a polarization point cloud generated by each polarization sensor. Performing the scanning operation also includes stitching the polarization images together to form a conjoined polarization sensor map. Performing the scanning operation additionally includes capturing a plurality of surface images of the object using a plurality of 3-D scanning sensors of the plurality of sensors. Each surface image defines a surface image point cloud generated by each of the 3-D scanning sensors of a surface or side of the object facing the 3-D scanning sensors. Performing the scanning operation additionally includes mapping the surface images to the conjoined polarization sensor map to generate a surface representation of the object of the surface or side of the object facing the plurality of sensors.

In accordance with another embodiment or any of the previous embodiments, the method or set of functions further includes illuminating a plurality of scanning regions using the depth map.

In accordance with another embodiment or any of the previous embodiments, the method or set of functions further includes determining a plurality of scanning areas using the depth map.

In accordance with another embodiment or any of the previous embodiments, stitching the polarization images together includes generating a representation of the object from the polarization point clouds. The representation of the object includes a resolution adaptive mesh.

In accordance with another embodiment or any of the previous embodiments, mapping the surface images to the conjoined polarization sensor map includes generating a representation of the object using the polarization point clouds and the surface image point clouds. The surface representation of the object includes a resolution adaptive mesh corresponding to the object for 3-D metrology of the object.

In accordance with another embodiment or any of the previous embodiments, generating the surface representation includes fitting a mesh to the polarization point clouds and the surface image point clouds using an intermediate implicit representation of each point cloud.

In accordance with another embodiment or any of the previous embodiments, stitching the point clouds together includes generating a resolution adaptive mesh using the point clouds. The resolution adaptive mesh corresponding to the reconstructed model of the as-manufactured object for 3-D metrology of the object.

In accordance with another embodiment or any of the previous embodiments, stitching the point clouds together includes fitting a mesh to the point clouds using an intermediate implicit representation of each point cloud.

In accordance with another embodiment or any of the previous embodiments, the method or set of functions, wherein an accuracy of the reconstructed model of the as-manufactured object is within about 0.003 inches to an actual manufactured object.

In accordance with another embodiment or any of the previous embodiments, the method or set of functions further including providing the reconstructed model of the as-manufactured object as an input to a machine controller of a machine to avoid inadvertent contact by the machine.

In accordance with another embodiment or any of the previous embodiments, wherein the plurality of sensors includes a one or more of an array of Light Detection and Ranging (LIDAR) devices or system, an array of special phase imaging sensors, an array of time-of-flight sensors or cameras, an array of stereoscopic cameras, an array of light field cameras, and an array of high resolution cameras or other type devices or sensors capable of performing the functions described herein.

In accordance with another embodiment or any of the previous embodiments, wherein the reconstructed model of the as-manufactured object is generated near real-time to performing the scanning operation.

The features, functions, and advantages that have been discussed can be achieved independently in various embodiments or may be combined in yet other embodiments further details of which can be seen with reference to the following description and drawings.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
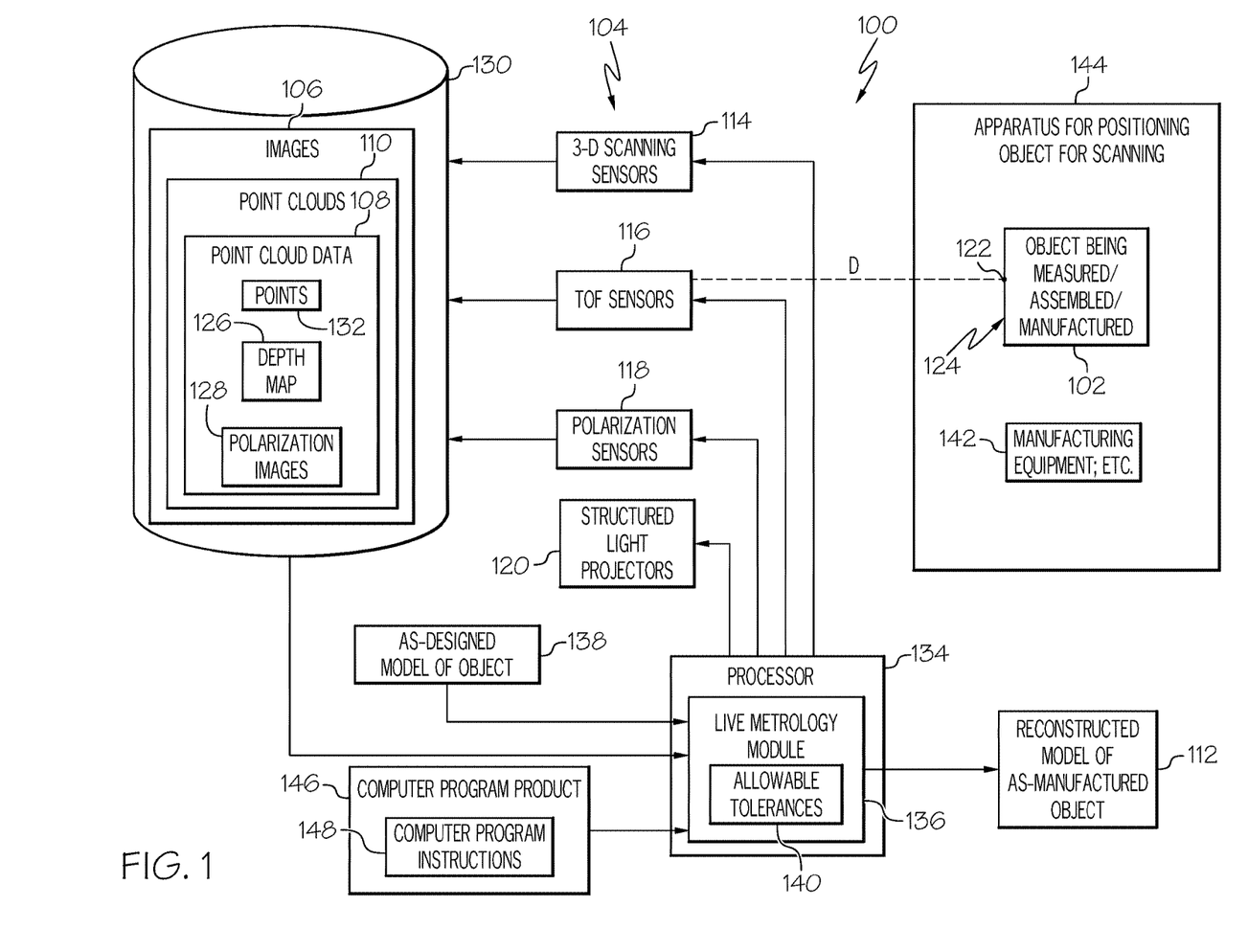
FIG. 1 is a block schematic diagram of an example of a system for performing live metrology of an object in accordance with an embodiment of the present disclosure.

FIG. 1 is a block schematic diagram of an example of a system 100 for performing live metrology of an object 102 in accordance with an embodiment of the present disclosure. The system 100 includes a plurality of sensors 104 for performing scanning operations to collect electronic images 106 of the object 102. The object 102 is being measured, assembled, manufactured and/or some other operation is being performed on the object 102 that uses a reconstructed model 112 of the as-manufactured object 102 as described herein. An example of a scanning operation performable by the system 100 is described in more detail with reference to FIGS. 2 and 3. The electronic images 106 include three-dimension (3-D) point cloud data 108 for live metrology or live 3-D metrology of the object 102. The point cloud data 108 from each sensor 104 defines a point cloud 110 that represents the object 102. Examples of the sensors 104 include but are not necessarily limited to digital cameras, Light Detection and Ranging (lidar) devices or systems, 3-D laser scanning devices, time-of-flight (TOF) cameras or sensors, special phase imaging sensors, stereoscopic cameras, light field cameras, high resolutions cameras or sensors, or similar imaging devices. The sensors 104 may include any combination of these different types of sensors and the different types of sensors 104 may be arranged or placed in a predetermined array or arrays or groupings similar to that in the exemplary embodiment 400 described with reference to FIG. 4. Additionally, the plurality of sensors 104 and structured light projectors 120 are placed or spaced a predetermined distance from the object 102 to avoid any interference from humans or equipment 142 used in manufacturing, assembly or other functions associated with the object 102.

In accordance with an embodiment, the plurality of sensors 104 include three-dimension (3-D) scanning sensors 114, TOF sensors 116 and polarization sensors 118 or other type scanning sensors. The exemplary system 100 also includes a plurality of structured light projectors 120 for illuminating a surface 124 of the object 102 facing the sensors 104 for a scanning operation. The 3-D scanning sensors 114 collect 3-D electronic images 106 of the object 102. The electronic images 106 include three-dimension (3-D) point cloud data 108 for live metrology of the object 102. The point cloud data 108 from each sensor 104 defines a point cloud 110 that represents the object 102.

The TOF sensors 116 collect images 106 including depth "D" or range data of points 122 or 3-D locations on a surface 124 of the object 102 from the sensors 104 during a scanning operation. The TOF sensors 116 determine the depth D or range by reflecting an infrared light beam on the object 102 and measuring a time from transmitting the light beam to return of the reflected light beam from the object 102. A point cloud 110 is generated by each TOF sensor 116 that includes the depth information of points 122 on the object 102. The point clouds 110 generated by the TOF sensors 116 define a depth map 126 for use in generating the reconstructed model 112 of the as-manufactured object 102 as described herein.

The polarization sensors 118 or other type scanning sensors collect polarization images 128 or other electronic scanning images that include vector information from which light is reflected from points 122 or 3-D locations on the object 102. The polarization images 128 from each polarization sensor 118 or other electronic scanning images from each scanning sensor define a point cloud 110 that includes measurements comprising 3-D shape information of the object 102 on a microscopic level used in generating the reconstructed model 112 of the as-manufactured object 102 as described herein.

The electronic images 106 include 3-D point cloud data 108 of the object 102. The point cloud data 108 from each sensor 104 defines a point cloud 110 that represents the object 102. Each point cloud 110 includes a multiplicity of points 132 and each point 132 includes at least location information for a corresponding point 122 on the surface 124 of the object 102. The point cloud data 108 or point clouds 110 from each sensor 104 are stored in a database 130 or other data storage device. In accordance with an embodiment, the object 102 is an aircraft or portion of an aircraft and the reconstructed model 112 of the as-manufactured object 102, as described herein, is used for 3-D live metrology of the aircraft or portion of the aircraft during assembly or manufacturing or for some other purpose. In other embodiments, the object 102 is any product or item or portion of a product or item and the reconstructed model 112, as described herein, is used to perform 3-D live metrology on the device or equipment during assembly, manufacturing or other operation.

The system 100 also includes a processor 134 and a live metrology module 136 operating on the processor 134. In accordance with an exemplary embodiment, the live metrology model is configured to perform the operations or functions described with reference to FIGS. 2 and 3. For example, the live metrology module 136 is configured to perform a set of functions including but not limited to stitching the point clouds 110 from the plurality of sensors 104 together to generate the reconstructed model 112 of the as-manufactured object 112 and to compare the reconstructed model 112 to an as-designed model 138 of the object 102 to determine that the object 102 is being manufactured within allowable tolerances 140 to the as-designed model 138 of the object 102. The reconstructed model 112 is generated near real-time to performing the scanning operation described with reference to FIGS. 2 and 3.

In accordance with an embodiment, the system 100 also includes an apparatus 144 for positioning the object 102 in different orientations or positions for scanning. For a large object 102, such as an aircraft or component of an aircraft, the object 102 may need to be positioned with different surfaces or sides facing the sensors 104 so that a reconstructed model 112 of the complete or entire as-manufactured object 102 can be generated or formed. In accordance with an embodiment, the apparatus 144 is also sized so that humans or equipment 142 used in manufacturing, assembly or other functions associated with the object 102 are movable with respect to the apparatus 144. The processor 134 controls operation of the 3-D scanning sensors 114, time-of-flight sensors 116, polarization sensors 118 or scanning sensors, and structured light projectors 120. In accordance with another embodiment, the processor 134 or another processor also controls apparatus 144 for positioning the object 102 for scanning.

Figure 2:
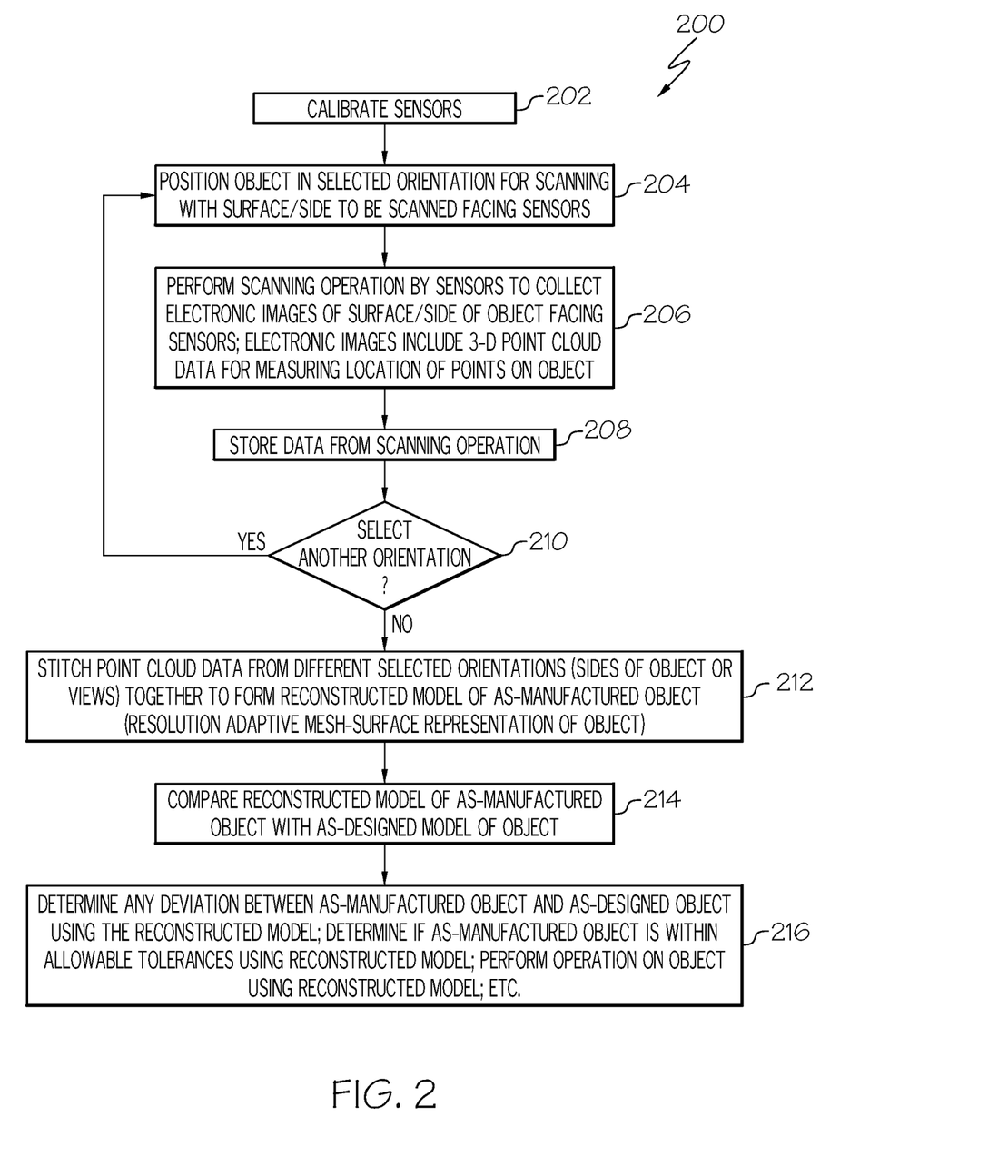
FIG. 2 is a flow chart of an example of a method for live metrology of an object in accordance with an embodiment of the present disclosure.

FIG. 2 is a flow chart of an example of a method 200 for live metrology of an object in accordance with an embodiment of the present disclosure. In accordance with an embodiment, the method 200 is embodied in and performed by the system 100 in FIG. 1. In block 202, the sensors are calibrated. A known or standard object which has verified dimensions to an as-designed object may be placed in the system 100 to calibrate the sensors to confirm that they are operating properly and are collecting accurate measurement data. Calibration also collects parameters (intrinsic and extrinsic parameters) used by the live metrology module 136 to properly run. An accuracy of the reconstructed model of the as-manufactured object is preferably within about 0.003 inches to the actual manufactured object being measured or for which the reconstructed model is being generated.

In block 204, the object is positioned in a selected orientation for performing the scanning operation with a surface or side of the object to be scanned facing the sensors. In block 206, a scanning operation is performed by a plurality of sensors to collect electronic images of the object. The electronic images include 3-D point cloud data for live 3-D metrology of the object. The point cloud data from each sensor defines a point cloud that represents the object similar to that previously described. An example of a scanning operation useable in block 206 will be described with reference to FIG. 3. In block 208, the 3-D point cloud data is stored after performing the scanning operation.

In block 210, a determination is made whether another orientation of the object is to be selected for scanning another surface or side of the object. If another orientation is selected, the method 200 returns to block 204 and the object is positioned or repositioned in another selected orientation for scanning another surface or side of the object. The method 200 then continues similar to that previously described. This process continues until all desired surfaces or sides of the object have been scanned to provide a complete reconstructed model of the as-manufactured object. The point cloud data or 3-D point cloud data is stored after performing each scanning operation.

In block 212, the point clouds from the plurality of sensors for all scanning operations are stitched or fused together to generate the reconstructed model of the as-manufactured object. Stitching the point clouds together includes stitching the point clouds from each of the selected orientations of the object together. In accordance with an embodiment, stitching or fusing the point clouds together includes generating a resolution adaptive mesh using the point clouds. The resolution adaptive mesh corresponds to the reconstructed model of the as-manufactured object for 3-D metrology of the object. An example of stitching or fusing the point clouds together by generating a resolution adaptive mesh is described in U.S. application Ser. No. 16/663,190, entitled "Resolution Adaptive Mesh for Performing 3-D Metrology of an Object" which is assigned to the same assignee as the present application and is incorporated herein by reference. This application discloses a method and system for representing and optimally combining point cloud data or 3-D point cloud data generated by a plurality of sensors or 3-D scanning system, similar to that described herein, and for measuring and tracking objects in large spatial volumes, such as for example, a factory during a manufacturing or assembly process of an object, such as an aircraft. The system and method converts point clouds into a surface representation useful for metrology while taking into account the spatial varying resolutions in different directions of the plurality of sensors observing the same object. The system and method does this by weighting the contribution of each point to the surface representation differently depending on the expected accuracy of the point in the point cloud. This is in contrast to existing surface reconstruction methods that weight all points equally and don't incorporate sensor resolution models or prior knowledge about the expected resolution of the sensors as a function of viewing direction and distance from the object. The system and method optimizes the 3-D surface representation of the object or reconstructed model of the as-manufactured object derived from stitching or fusion of the point clouds from the plurality of sensors observing the same object but from different directions and distances.

In accordance with another embodiment, stitching the point clouds together includes fitting a mesh to the point clouds using an intermediate implicit representation of each point cloud. An example of stitching or fusing point clouds together using an intermediate implicit representation of each point cloud is described in U.S. application Ser. No. 15/663,243, entitled "Resolution Adaptive Mesh That Is Generated Using an Intermediate Implicit Representation of a Point Cloud," which is assigned to the same assignee as the present application and is incorporated herein by reference. This application describes a system and method for representing and optimally combining point cloud data or 3-D point cloud data generated by a plurality of sensors or 3-D scanning system, similar to that described herein that measures and tracks objects in large spatial volumes such as a factory floor during an assembly or manufacturing process of such an object, such as an aircraft. The method or system converts point clouds into a surface representation useful for metrology while taking into account the spatial varying resolutions in different directions of the plurality of sensors or 3-D scanning system observing the same object. The method or system does this by converting the point cloud or point clouds into an optimized point cloud for mesh fitting using an intermediate implicit representation of the point cloud or point clouds that takes into consideration resolution of each of the sensors of the 3-D scanning system. The method or system optimizes the 3-D surface representation of the object or reconstructed model of the as-manufactured object derived from stitching or fusion of the point clouds from the plurality of sensors observing the same object but from different directions and distances.

In block 214, the reconstructed model of the as-manufactured object is compared to an as-designed model of the object to determine that the object is manufactured within an allowable tolerance to the as-designed model of the object.

In block 216, any deviation between the as-manufactured object and the as-designed object is determined using the reconstructed model of the as-manufactured object. The reconstructed model is used for 3-D metrology of the object similar to that described in U.S. application Ser. No. 15/663,190, entitled "Resolution Adaptive Mesh for Performing 3-D Metrology of an Object" and U.S. application Ser. No. 15/663,243, entitled "Resolution Adaptive Mesh That Is Generated Using an Intermediate Implicit Representation of a Point Cloud." An operation may be performed on the object, such as a manufacturing operation using the reconstructed model. For example, in accordance with an embodiment, the reconstructed model of the as-manufactured object is used as an input to a machine controller of a machine to avoid inadvertent contact by the machine.

Figure 3:
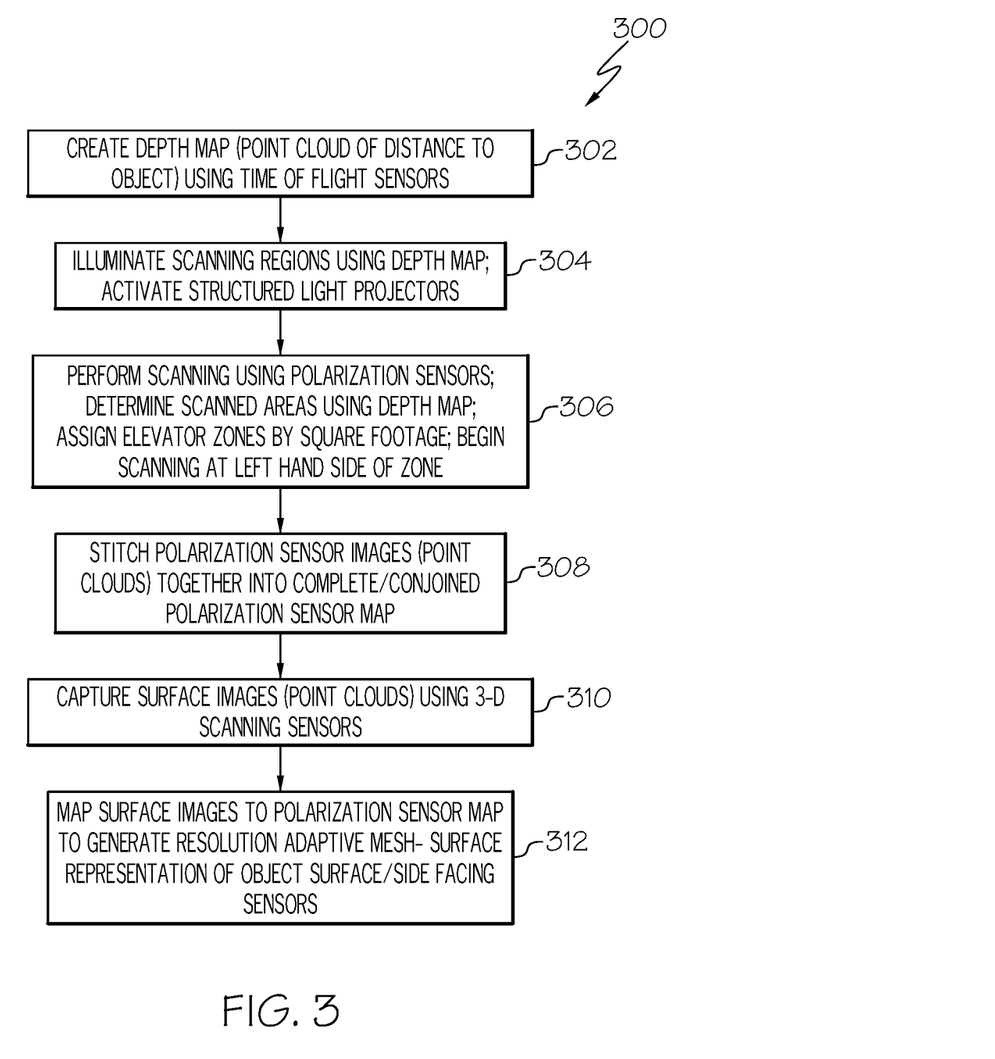
FIG. 3 is flow chart of an example of a method for performing a scanning operation to generate a surface representation of an object in accordance with an embodiment of the present disclosure.

FIG. 3 is flow chart of an example of a method 300 for performing a scanning operation to generate a surface representation of an object in accordance with an embodiment of the present disclosure. In accordance with an embodiment, the method 300 is used for performing the scanning operation in block 206 in FIG. 2. In accordance with an embodiment, the method 300 is embodied in and performed by the system 100 in FIG. 1. In block 302, a depth map is created using a group of time-of-flight sensors of the plurality of sensors. The depth map includes a point cloud of point cloud data including distances or ranges from the time-of-flight sensors to the object.

In block 304, a plurality of scanning regions are illuminated using the depth map. In accordance with the exemplary embodiment in FIG. 1, the scanning regions are illuminated by the structured light projectors 120.

In block 306, the object is scanned using a multiplicity of polarization sensors or other scanning sensors of the plurality of sensors using the depth map to collect a multiplicity of polarization images. A plurality of scanning areas on the object are determined using the depth map. Each polarization image defines a polarization point cloud generated by each polarization sensor. In accordance with an embodiment, the polarization or scanning sensors are mounted on an elevator for movement relative to the object for scanning. Elevator zones associated with the elevators are assigned by square footage to keep the areas defined by the elevator zones clear of objects during a scanning operation. Sensors are also mountable on pan/tilt units for performing scanning operations and areas associated with these are also kept clear of objects during scanning.

In block 308, the polarization images are stitched or fused together to form a complete, conjoined or fused polarization sensor map. In accordance with an embodiment, the polarization images are stitched or fused together using techniques described in U.S. application Ser. No. 15/663,190 or U.S. application Ser. No. 15/663,243. Stitching the polarization images together includes generating a representation of the object from the polarization point clouds. The representation of the object includes a resolution adaptive mesh.

In block 310, a plurality of surface images of the object are captured or collected using a plurality of 3-D scanning sensors of the plurality of sensors. Each surface image defines a surface image point cloud generated by each of the 3-D scanning sensors of a surface or side of the object facing the 3-D scanning sensors.

In block 312, the surface images are mapped to the conjoined or complete polarization sensor map to generate a surface representation of the object of the surface or side of the object facing the plurality of sensors. In accordance with an embodiment, the point clouds defining the surface images of the object and the polarization images are mapped or fused using techniques described in U.S. application Ser. No. 15/663,190 or U.S. application Ser. No. 15/663,243. Mapping the surface images to the conjoined or complete polarization sensor map includes generating a surface representation of the object using the polarization point clouds and the surface image point clouds. The surface representation of the object includes a resolution adaptive mesh corresponding to the object for 3-D live metrology of the object. In accordance with an embodiment, generating the surface representation includes fitting a mesh to the polarization point clouds and the surface image point clouds using an intermediate implicit representation of each point cloud.

Figure 4:
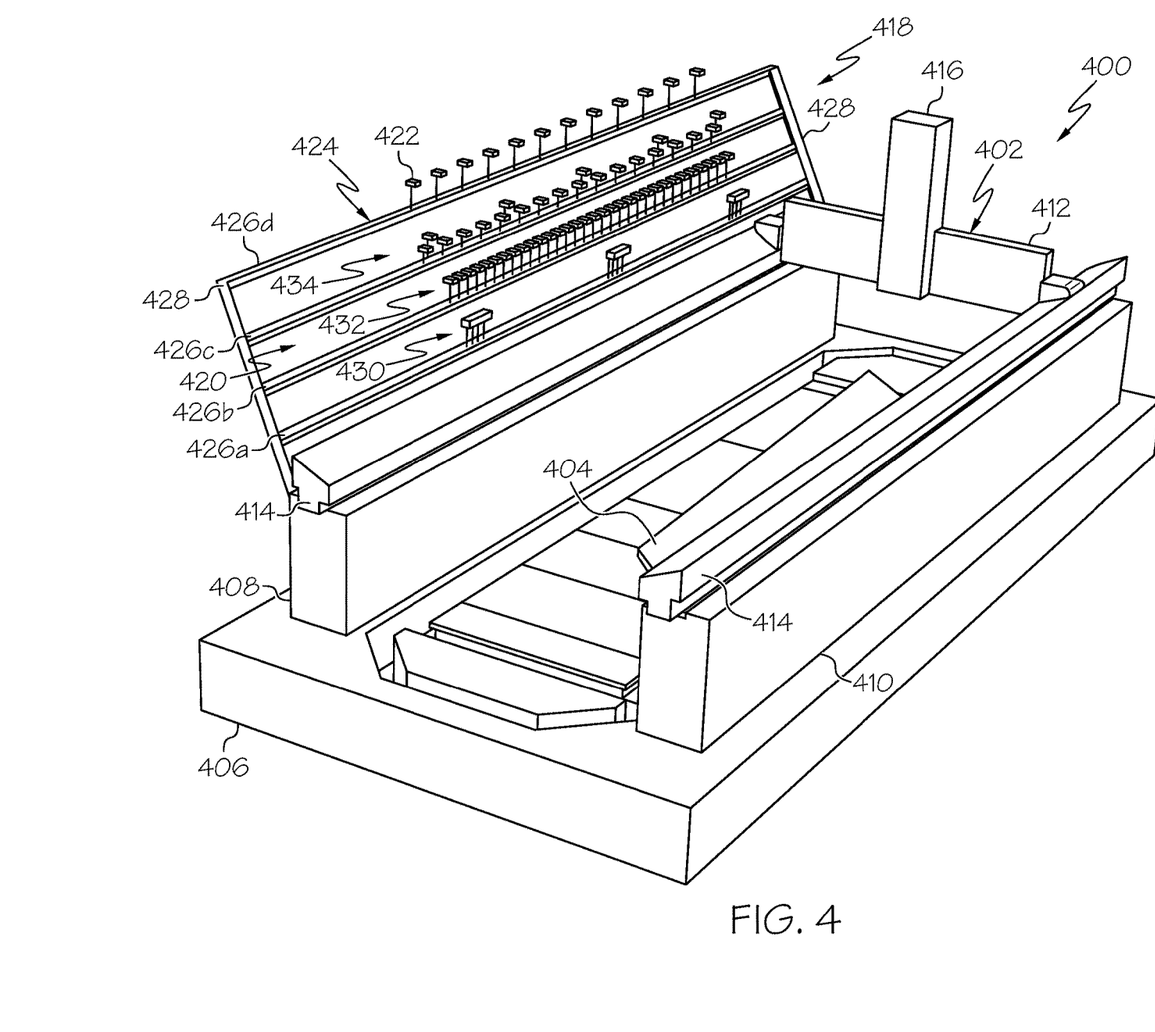
FIG. 4 is an illustration of an example of a system for performing live metrology of an object in accordance with another embodiment of the present disclosure.

FIG. 4 is an illustration of an example of a system 400 for performing live metrology of an object 404 in accordance with another embodiment of the present disclosure. In accordance with an exemplary embodiment the system 400 is used for the system 100 in FIG. 1 or is part of the system 100 in FIG. 1. The system 400 includes an apparatus 402 for positioning an object 404 for scanning. The apparatus 402 may be used for the apparatus 144 in FIG. 1. The apparatus 402 for positioning the object 404 includes a base 406 and a pair of opposite side walls 408 and 410 extending from the base 406. A gantry 412 extends between the tops of the sides walls 408 and 410 and moves along a track 414 on each side wall 408 and 410. The gantry 412 includes a crane 416 for positioning or repositioning the object 404 for scanning different surfaces or sides of the object 404 as described herein.

The system 400 also includes a mounting arrangement 418 for supporting a plurality of sensors 420 and lighting projectors 422 for performing scanning operations. In accordance with an embodiment, the mounting arrangement 418 includes a plurality of trusses 424 or a ladder type structure including a plurality of horizontal structural members 426 for mounting the sensors 420 and lighting projectors 422 extending between vertical structural members 428. Similar to that previously described, in accordance with an embodiment, the sensors 420 include different types of sensors or cameras for collecting different types of data for generating a reconstructed model of an as-manufactured object. The sensors 420 are placed in predetermined arrays or groups based on a particular scanning operation and/or object being scanned. For example, a first horizontal structural member 426a includes a plurality of arrays of pan/tilt units 430 for scanning the object 404 and collecting electronic images including data for generating the reconstructed model of the as-manufactured object 404. Examples of the pan/tilt units 430 include but are not limited to 3-D scanning sensors or devices. A second horizontal structural member 426b includes a plurality of arrays of 3-D scanning sensors 432 or cameras. A third horizontal structural member 426c includes a plurality of arrays of time-of-flight sensors 434 and a fourth horizontal structural member 426d includes a plurality of lighting projectors 422 or infrared lighting projectors. The exemplary embodiment in FIG. 4 illustrates the mounting arrangement 418 and sensors 420 on one side of the system 400 or associated with one side wall 408. In another embodiment, a mounting arrangement 418 and sensors 420 are on both sides of the system 400, or are associated with both side walls 408 and 410.

In accordance with an embodiment, either of the methods 200 and 300 are embodied on a computer program product, such as computer program product 146 in FIG. 1. The computer program product 146 includes a computer readable storage medium similar to that previously described having computer program instructions 148 embodied therewith. The computer readable storage medium is not a transitory medium per se. The program instructions are executable by a device, such as processor 134 in FIG. 1 to cause the device to perform the method 200 or 300. In accordance with an embodiment, the computer program instructions 148 define the live metrology module 136 which is stored on a storage device in association with the processor 134 and is downloadable from the computer program product 146.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for live metrology of an object, comprising:
performing a scanning operation by a plurality of different types of sensors to collect electronic images of an object for each of one or more selected orientations of the object relative to the plurality of sensors, the electronic images comprising 3-D point cloud data for live metrology of the object and the point cloud data from each sensor defining a point cloud that represents the object, wherein performing the scanning operation comprises:
creating a depth map using a group of time-of-flight sensors of the plurality of sensors, wherein the depth map comprises a point cloud of point cloud data including distances from the time-of-flight sensors to the object;
scanning the object using a multiplicity of polarization sensors of the plurality of sensors using the depth map to collect a multiplicity of polarization images, wherein each polarization image includes vector information from which light is reflected from points or 3-D locations on the object;
stitching the polarization images together to form a conjoined polarization sensor map;
capturing a plurality of surface images of the object using a plurality of 3-D scanning sensors of the plurality of sensors, wherein each surface image defines a surface image point cloud generated by each of the 3-D scanning sensors of a surface or side of the object facing the 3-D scanning sensors; and
mapping the surface images to the conjoined polarization sensor map to generate a surface representation of the object of the surface or side of the object facing the plurality of sensors; and stitching the point clouds from each selected orientation of the object together to generate a reconstructed model of an as-manufactured object.

2. The method of claim 1, further comprising placing the plurality of sensors in a predetermined array or arrays of different types of sensors.

3. The method of claim 1, further comprising placing the plurality of sensors a predetermined distance from the object to avoid interference from humans and equipment during manufacturing.

4. The method of claim 1, further comprising:
positioning the object in a selected orientation for performing the scanning operation with a surface or side of the object to be scanned facing the sensors;
storing the 3-D point cloud data after performing the scanning operation;
repositioning the object in other selected orientations for scanning other surfaces or sides of the object; and
storing the 3-D point cloud data after performing each scanning operation, wherein stitching the point clouds together comprises stitching the point clouds from each of the selected orientations of the object together.

5. The method of claim 1, further comprising illuminating a plurality of scanning regions using a structured light projector.

6. The method of claim 1, further comprising illuminating a plurality of scanning regions using the depth map.

7. The method of claim 1, further comprising determining a plurality of scanning areas using the depth map.

8. The method of claim 1, wherein stitching the polarization images together comprises generating a representation of the object from the polarization images, the representation of the object comprising a resolution adaptive mesh.

9. The method of claim 1, wherein mapping the surface images to the conjoined polarization sensor map comprises generating a representation of the object using the polarization images and the surface image point clouds, the surface representation of the object comprising a resolution adaptive mesh corresponding to the object for 3-D metrology of the object.

10. The method of claim 9, wherein generating the surface representation comprises fitting a mesh to the polarization images and the surface image point clouds using an intermediate implicit representation of each point cloud.

11. The method of claim 1, wherein stitching the point clouds together comprises generating a resolution adaptive mesh using the point clouds, the resolution adaptive mesh corresponding to the reconstructed model of the as-manufactured object for 3-D metrology of the object.

12. The method of claim 1, wherein stitching the point clouds together comprises fitting a mesh to the point clouds using an intermediate implicit representation of each point cloud.

13. The method of claim 1, wherein an accuracy of the reconstructed model of the as-manufactured object is within about 0.003 inches to an actual manufactured object.

14. The method of claim 1, further comprising providing the reconstructed model of the as-manufactured object as an input to a machine controller of a machine to avoid inadvertent contact by the machine.

15. The method of claim 1, further comprising comparing the reconstructed model of the as-manufactured object to an as-designed model of the object to determine that the object is manufactured within an allowable tolerance to the as-designed model of the object.

16. The method of claim 1, further comprising performing an operation on the object using the reconstructed model.

17. A system for live metrology of an object, comprising:
a plurality of different types of sensors for performing a scanning operation to collect electronic images of an object, the electronic images comprising 3-D point cloud data for live metrology of the object and the point cloud data from each sensor defining a point cloud that represents the object, wherein performing the scanning operation comprises:
creating a depth map using a group of time-of-flight sensors of the plurality of sensors, wherein the depth map comprises a point cloud of point cloud data including distances from the time-of-flight sensors to the object;
scanning the object using a multiplicity of polarization sensors of the plurality of sensors using the depth map to collect a multiplicity of polarization images, wherein each polarization image includes vector information from which light is reflected from points or 3-D locations on the object;
stitching the polarization images together to form a conjoined polarization sensor map;
capturing a plurality of surface images of the object using a plurality of 3-D scanning sensors of the plurality of sensors, wherein each surface image defines a surface image point cloud generated by each of the 3-D scanning sensors of a surface or side of the object facing the 3-D scanning sensors; and
mapping the surface images to the conjoined polarization sensor map to generate a surface representation of the object of the surface or side of the object facing the plurality of sensors; wherein the system further comprises
a processor; and
a live metrology module operating on the processor, the live metrology module being configured to perform a set of functions comprising:
stitching the point clouds from one or more scanning operations of one or more selected orientations of the object together to generate a reconstructed model of an as-manufactured object.

18. The system of claim 17, wherein the plurality of sensors comprise one or more of an array of Light Detection and Ranging (LIDAR) devices or system, an array of special phase imaging sensors, an array of time-of-flight sensors or cameras, an array of stereoscopic cameras, an array of light field cameras, and an array of high resolution cameras.

19. The system of claim 17, wherein the reconstructed model of the as-manufactured object is generated near real-time to performing the scanning operation.

20. A computer program product for live metrology of an object, the computer program product comprising a computer readable storage medium having program instructions embodied therewith, wherein the computer readable storage medium is not a transitory medium per se, the program instructions being executable by a device to cause the device to perform a method comprising:
performing a scanning operation by a plurality of different types of sensors to collect electronic images of an object for each of one or more selected orientations of the object relative to the plurality of sensors, the electronic images comprising 3-D point cloud data for live metrology of the object and the point cloud data from each sensor defining a point cloud that represents the object, wherein performing the scanning operation comprises:
creating a depth map using a group of time-of-flight sensors of the plurality of sensors, wherein the depth map comprises a point cloud of point cloud data including distances from the time-of-flight sensors to the object;

scanning the object using a multiplicity of polarization sensors of the plurality of sensors using the depth map to collect a multiplicity of polarization images, wherein each polarization image includes vector information from which light is reflected from points or 3-D locations on the object;

stitching the polarization images together to form a conjoined polarization sensor map;

capturing a plurality of surface images of the object using a plurality of 3-D scanning sensors of the plurality of sensors, wherein each surface image defines a surface image point cloud generated by each of the 3-D scanning sensors of a surface or side of the object facing the 3-D scanning sensors; and mapping the surface images to the conjoined polarization sensor map to generate a surface representation of the object of the surface or side of the object facing the plurality of sensors; and stitching the point clouds from each selected orientation of the object together to generate a reconstructed model of an as-manufactured object.

* * * * *